United States Patent

Zach, Sr.

Patent Number: 5,845,876
Date of Patent: Dec. 8, 1998

[54] BULKHEAD INFANT-TODDLER PASSIVE RESTRAINT SYSTEM

[76] Inventor: Howard L. Zach, Sr., 517 Juneau Ave., Fairbanks, Ak. 99701

[21] Appl. No.: 873,035

[22] Filed: Jun. 11, 1997

[51] Int. Cl.$^6$ .................................................. B64D 11/06
[52] U.S. Cl. .................................... 244/118.6; 244/122 R; 244/122 B; 224/161; 297/136; 297/256.13; 297/256.16
[58] Field of Search ............................ 244/118.5, 118.6, 244/122 R, 122 B; 224/158, 159, 161; 297/250.1, 256.1, 256.13, 256.16, 136, 139, 173, 174

[56] References Cited

U.S. PATENT DOCUMENTS

| | | | |
|---|---|---|---|
| 2,156,252 | 4/1939 | Cichero | 244/118.6 |
| 2,540,291 | 2/1951 | Reingold | 297/136 X |
| 2,605,816 | 8/1952 | Vuori | 297/136 X |
| 2,742,212 | 4/1956 | Siftar | 224/161 |
| 3,898,704 | 8/1975 | Gallaher et al. | 244/118.6 X |
| 4,511,177 | 4/1985 | O'Sullivan | 297/136 |
| 4,787,677 | 11/1988 | Reighter . | |
| 5,031,960 | 7/1991 | Day . | |
| 5,080,441 | 1/1992 | Stevenson et al. . | |
| 5,118,163 | 6/1992 | Brittain et al. | 297/250.1 |
| 5,219,203 | 6/1993 | Switlik . | |
| 5,232,263 | 8/1993 | D'Ull et al. . | |
| 5,248,181 | 9/1993 | Efthimiou | 297/256.16 X |
| 5,265,828 | 11/1993 | Bennington | 244/118.6 X |
| 5,344,212 | 9/1994 | Muller et al. | 297/250.1 X |
| 5,697,580 | 12/1997 | Reinhardt | 244/118.5 |

Primary Examiner—William Grant
Attorney, Agent, or Firm—Patent & Trademark Services; Thomas Zack; Joseph H. McGlynn

[57] ABSTRACT

An apparatus for storing infant's safety seat within a movable passenger carrying transporter such as an aircraft or bus in the transporter's bulkhead section. The seat may be stored in a compartment located within a table or within a formed bulkhead storage compartment. When stored in a table, a hinged connection pivotally mounts the seat to the table. When in the bulkhead compartment a vertical door permits the infant to be placed within the seat in the compartment. In either embodiment an infant accessory storage mesh bag may be used to store infant items such as diapers, toys, or other infant care items.

4 Claims, 4 Drawing Sheets

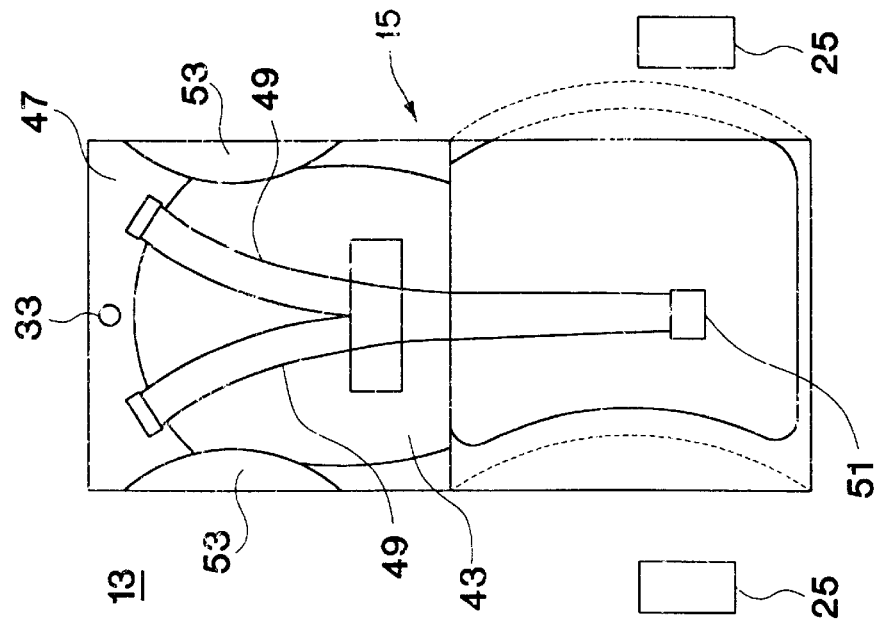
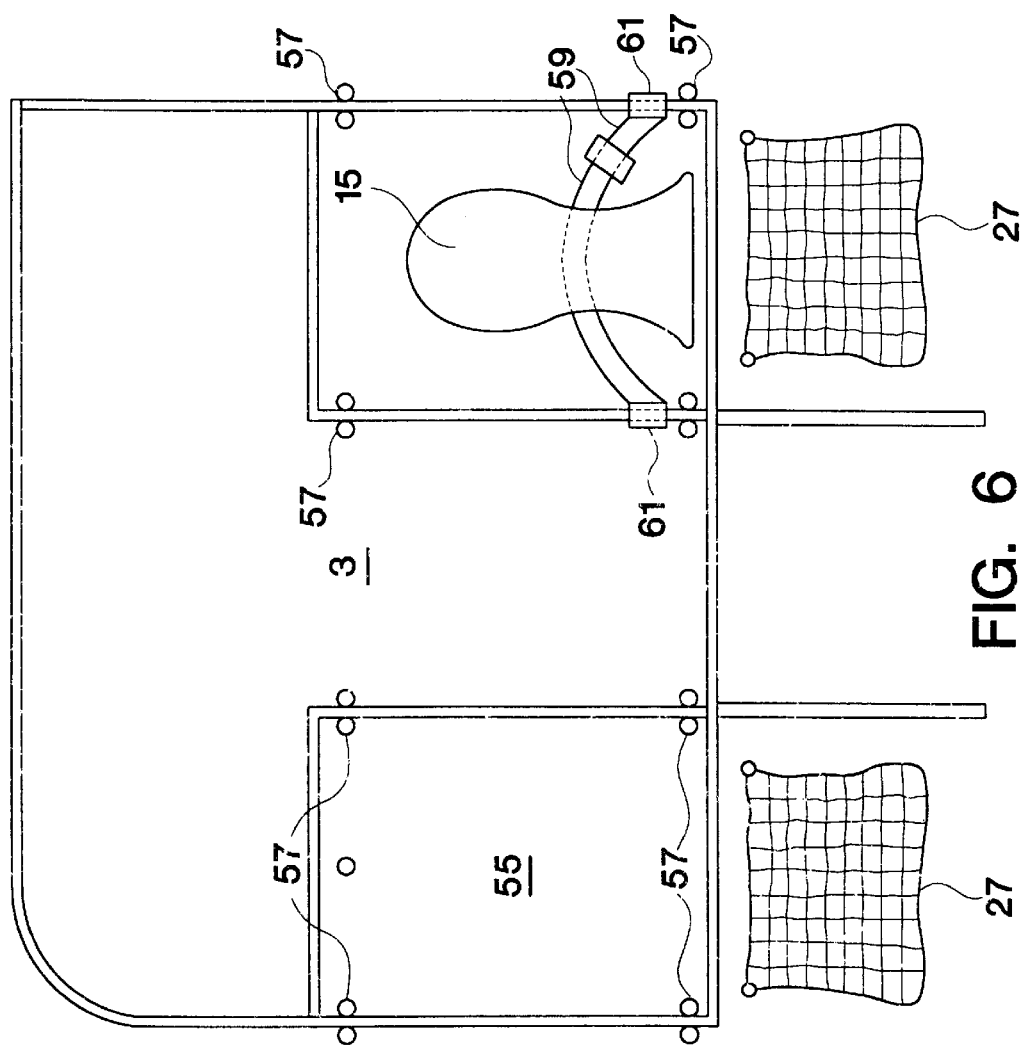

BULKHEAD INFANT-TODDLER PASSIVE RESTRAINT SYSTEM

BACKGROUND OF THE INVENTION

Any one who has traveled with infants or toddlers on commercial aircraft or buses knows there is a safety concern. Rough weather or sudden stops, turns or starts may propel the infant or toddler from a safe seated position into a dangerous situation. For example, in many commercial aircraft infants under the age of two years are not required to pay for seating and may be transported on the lap of a parent or other adult. Should there be a sudden movement of the aircraft caused by weather, air turbulence or other factors acting on the aircraft the adult may not be able to keep the seated infant restrained resulting in injury or worse to the infant.

The present invention seeks to address these concerns by providing for a bulkhead restraint system that will replace the current bulkhead system found on most commercial aircraft or buses. In addition to supplying increased safety for the transported infants, the invention provides for storage of diaper bags and other infant care or amusement articles.

DESCRIPTION OF THE PRIOR ART

Infant restraint systems are known. For example, in U.S. Pat. No. 4,787,677 an infant or child harness restraint device is disclosed which is detachably secured directly to an unaltered vehicle lap belt. In the Day reference (U.S. Pat. No. 5,031,960) another child restraint system uses a vest for the child's torso and a backrest coupled to restraints.

The Stevenson invention (U.S. Pat. No. 5,080,441) discloses a safety seat for a child for airplane use having a retractor system with straps. And in U.S. Pat. No. 5,219,203 to Switlik an airplane safety seat for lap supported children is disclosed which has protective frame and with a springy resistance inner portion. In contrast to these inventions and the known prior art, the present invention provides for a redesigned aircraft or bus bulkhead system specifically designed to safely and economically accommodate the needs of infants and toddlers as more fully set forth in this specification.

SUMMARY OF THE INVENTION

This invention relates to a bulkhead safety system specifically designed to safety transport and service infants and toddlers on an aircraft or bus. An elevated horizontally disposed planar surface or table permits the attachment of one or more self-contained infant seats on its top surface. Containers for infant care articles may depend from its lower surface. Appropriate seat retaining slots and supports are in the planar surface while safety belt latches and a harness are on the seat itself.

It is the primary object of the present invention to provide for an improved bulkhead safety seating apparatus.

Another object is to provide for such a apparatus wherein one or more seats with safety harnesses are stored in a planar surface.

These and other objects and advantages of the present invention will become apparent to readers from a consideration of the ensuing description and the accompanying drawings.

BRIEF DESCRIPTION OF THE DRAWINGS

FIG. 5 show a top enlarged view of infant seat and the supporting safety restraint system.

FIG. 6 shows a front view of internal working elements of one of infant seats in a second bulkhead mounted embodiment of the invention in its lower position.

DESCRIPTION OF THE PREFERRED EMBODIMENT

Figure 1:
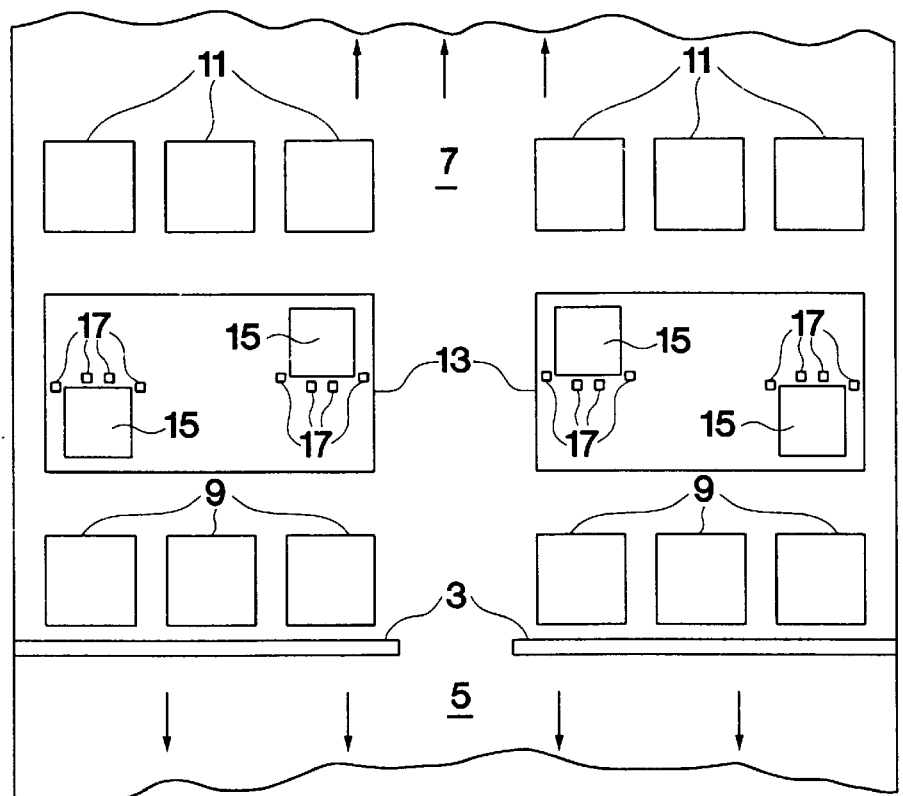
FIG. 1 is a schematic top view of the invention's preferred embodiment showing its placement within the confines of an aircraft.

FIG. 1 is a schematic top view of the invention's preferred first embodiment showing its placement within the confines of an aircraft. Within the confines of the aircraft hull 1 there normally is a vertical wall partition 3 between the first class or pilot's cabin area 5 and the tourist or economy seating of the aircraft 7. The vertical wall partition 3 and its associated area immediately to its rear is commonly referred to as the bulkhead area of the aircraft and is commonly occupied by persons with infants or small children. This area is preferred by them since there is a wall passenger separation in the front and more leg or volume room for them to spread out. In this embodiment there are a series (six shown) rear facing conventional passenger seats 9 and the same number of conventional forward facing passenger seats 11. Located between the two sets of facing seats are two aisle separated identical rectangular tables 13.

Each table 13 is secured to the aircraft's floor and has two self-contained infant seats 15 mounted on opposite sides of it. Associated with each mounted seat are seat belts 17 used to secured the in-place infant to its seat and the table. Between the seats on each table is sufficient open space on the table's upper surface to permit the changing of the infant's diapers, the playing of games or any other purpose.

Figure 2:
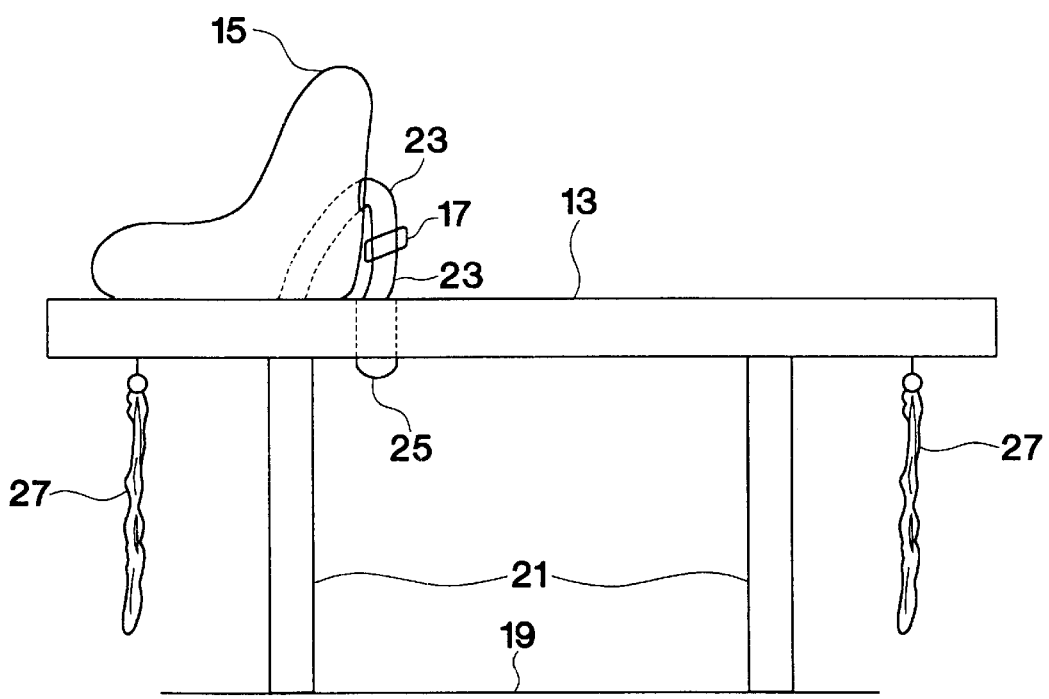
FIG. 2 is a side view of the table used in the FIG. 1 embodiment showing its table.

FIG. 2 is a side view of the table used in the FIG. 1 embodiment showing its table 13. Only one of the self-contained infant's seats is shown in this view, the other having the same construction. The table's horizontal surface is elevated from the aircraft's passenger compartment floor 19 by four corner spaced legs 21, two of which are shown.

Seat belts 17 and their seat fastening buckles 23 fit into recesses 25 extending from the top of the table into the surface of the table for storage. Vertically disposed depending mesh nylon bags or storage containers 27, one for each infant seat, are mounted on the underside of the table and used to carry items such as diapers, baby bottles, powder containers and any other infant care products.

Figure 3:
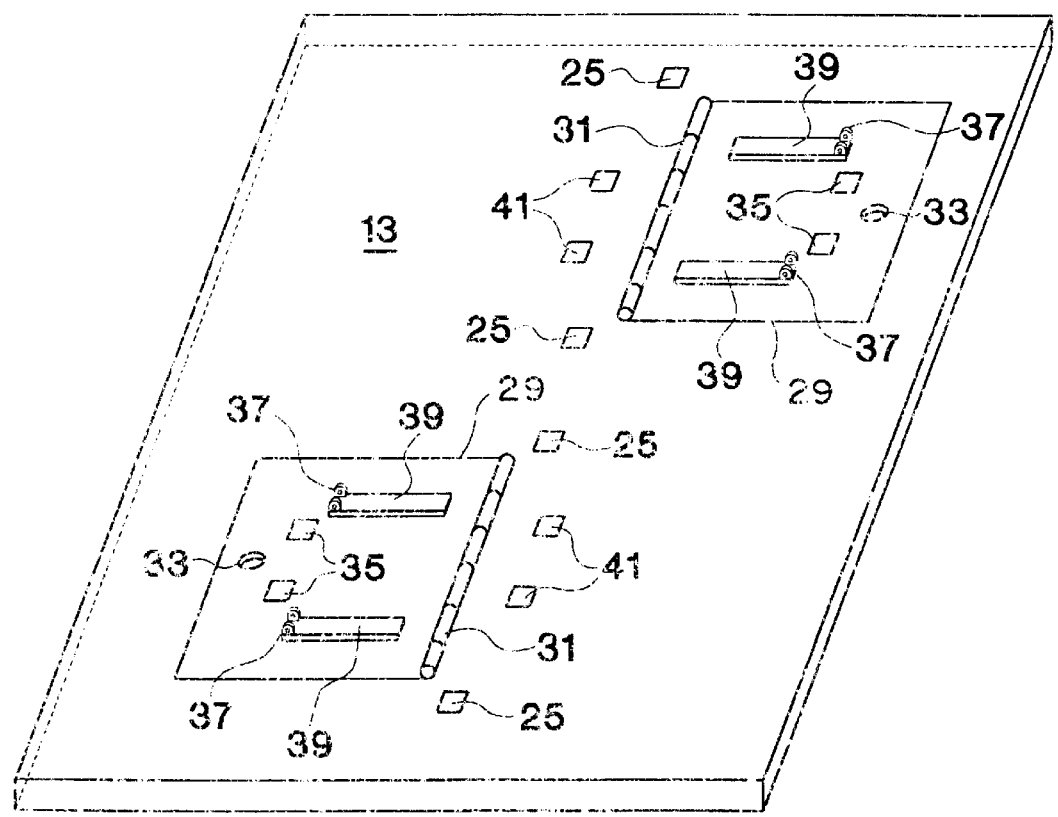
FIG. 3 shows a top view of the table top used with two self-contained infant seats.

FIG. 3 shows a top view of the table top used in the first embodiment with two self-contained infant seats. For simplicity purposes associated table items such as the tables legs and its mesh bags have been omitted in this figure. In this view the upright seat 15 of FIG. 2 is shown in its retracted lowered position within the table top with a door 29 closed. Hinges 31 along one side of the door act to secure the door to the table top and also to permit its lifting up by engaging the door's finger hole 33.

Parallel slots 35 in the door permit the insertion of the seat belt into the body of the door while pivotally mounted 37 seat supports 39 fall to support the hinged door and its attached seat when placed in an upright position such as shown in FIG. 2. Recessed spaced holes 41 are spaced to receive the free ends of the supports 39 when the normally downwardly facing seat is placed in an upright position to permit limited movement of the supports.

Figure 4:
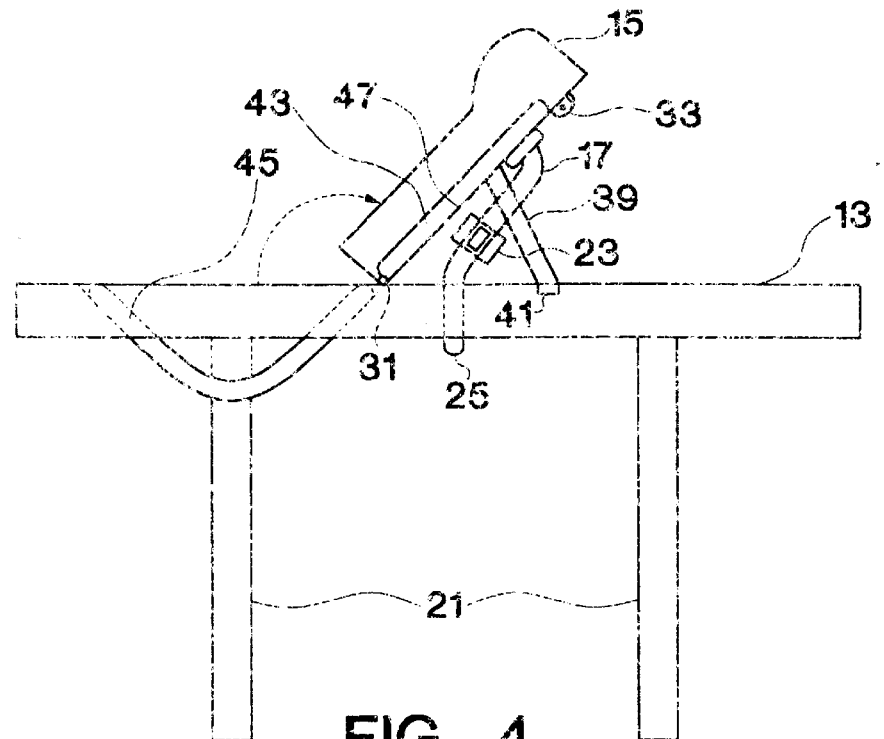
FIG. 4 shows a side view of one of the infant seats in its upright position on the table.

FIG. 4 shows a side view of one of the infant seats in FIG. 3 in its upright position on the table and supported by supports 39 in holes 41. A removable vinyl foam pad 43 is built into the table opening 45 used to store the seat 15 upside down. This foam pad can extend from within the opening 45 to completely or substantially fill the opening and be attached to the infant's seat back engaging section 47. The other side of the back section may be the door 29 shown closed in FIG. 3. The arrow indicates the direction the fold down seat 15 moves on its hinged 31 lower door back as it is opened. Also to be noted are the table surface recesses 25, previously described, used to store the seat attached belt and its buckle when not in use.

FIG. 5 shows a top enlarged view of infant seat 15 and its supporting safety restraint system. The folded foam pad has its upper section against the back of the seat back engaging section 47. An infant engaging safety belt harness 49, similar to the belt in a car's infant seat, fits over the shoulders of a seated infant and extends through holes in the rigid section 47 to fasten it to the door. A lower latch 51 permits the belt to be fastened to the harness to be secured or removed by an adult. Extending along the seat are two inwardly facing soft supports. The upper two supports 53 engage the infants head while its back engages the soft vinyl foam pad 43. The two side storage recesses 25 for the belt and its buckle are also shown.

FIG. 6 shows a front view of the internal working elements of one of the infant seats in a second bulkhead mounted lowered position. In this embodiment there is no free standing table 13 and the infant seats 15 are located in cavities compartment built into the bulkhead wall 3. The infant seat's belt is permanently attached to the bulkhead wall. In the right hand side the door 55, shown closed in the left side, is opened to reveal the stored infant seat. This door may have lower side hinges or may be completely removed from the front of its built-in cavity by twisting four corner door wing nuts 57 to vertically upright positions as shown where the right door is removed. The mesh nylon bags 27 are is shown depending from bulkhead storage compartments. As before, each of the two infant seats have their own safety harness to permit the secure placement of the infant in its seat within the compartment. A removable safety belt 59 secures the seat to the compartment and it is attached to the compartment at its walls 61.

Figure 7:
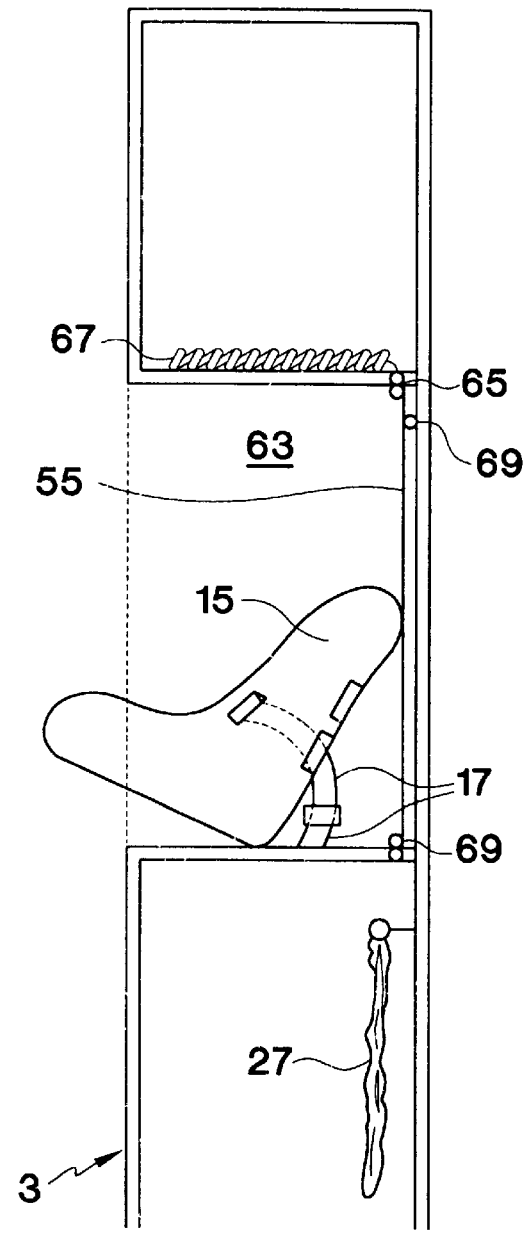
FIG.7 shows a side sectional view of the infant seat and its supporting safety restraint system of the second embodiment located within the an aircraft.

FIG.7 shows a side sectional view of the infant seat and its supporting safety restraint system of the second embodiment located within the bulkhead of an aircraft. The removed door 55 is shown pushed back into the bulkhead cavity compartment 63 and secured in place by rear wing nuts 65. A spring 67 is attached to the door to bias the door toward the front—shown by dotted vertical line—of the opened compartment 63 and insure its placement on the compartments front face when the holding rear wing nuts 65 are disengaged. Also shown are the in place infant seat 15 secured to the bulk compartment at points 61 and the seat's belt 17 and the nearer depending mesh nylon bag 27.

Figure 8:
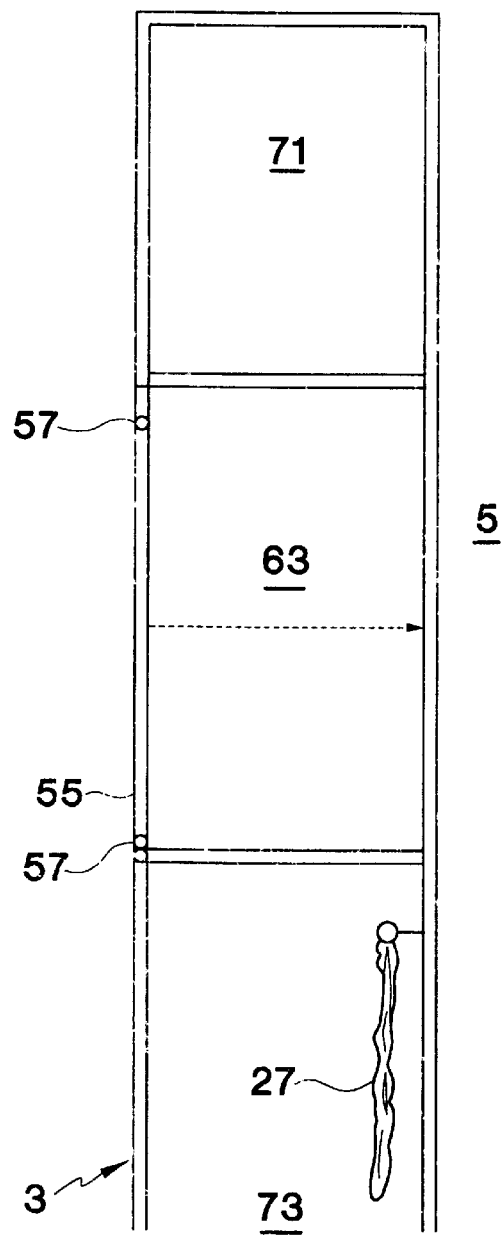
FIG.8 shows a side sectional view of compartment for the stored infant seat and its supporting safety restraint system for the bulkhead of the FIG. 6 located within the bulkhead of an aircraft.

FIG. 8 shows a side sectional view of the compartment for the stored infant seat and its supporting safety restraint system as used in FIG. 6, This compartment is located within the bulkhead of an aircraft. In this view the infant seat is not shown but is located in its stored position within the seat storage compartment 63. The upper bulkhead compartment 71 may be used for storage of infant care items such as diapers, powders, oils, etc. The lower near area 73 between the passenger and the bulkhead partition and nylon mesh bag 27 is left opened for the passenger's feet.

Variations in the specific details of the two disclosed embodiments are contemplated and possible. The tables of the first embodiment may fold into the side hull walls or the floor. In the second bulkhead storage compartment embodiment, the infant seats could be fastened to pivot outwardly from the compartments with a front closure doors.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An infant seat and storage compartment located within a passenger transporter comprising in combination:

an aircraft passenger transporter having a bulkhead partition wall;

an infant seat mounted within said aircraft passenger transporter;

an infant seat storage compartment located in said movable passenger transporter for storing said infant seat within the compartment , said infant seat storage compartment including a pivotally mounted closable door on a horizontally disposed table surface of a adjacent said aircraft's partition wall;

means mounted on said infant seat storage compartment to engage and restrain an infant seated in said stored infant seat; and an infant accessory storage container located adjacent said infant seat storage compartment for storing infant care products.

2. The infant seat and storage compartment located within a passenger transporter, as claimed in claim 1, wherein said table is separated from the bulkhead partition wall by passenger seats.

3. The infant seat and storage compartment located within a passenger transporter, as claimed in claim 2, wherein said infant accessory storage container located adjacent said stored infant seat includes a mesh bag depending from the table.

4. The infant seat and storage compartment located within a passenger transporter, as claimed in claim 2, further comprising a bulkhead compartment built into said bulkhead partition wall, wherein a second infant seat is mounted and stored within said bulkhead compartment, and a second infant accessory storage container is located adjacent said second stored infant seat and includes a mesh bag depending from the lower portion of the bulkhead compartment.

* * * * *